July 28, 1953  A. ARVIDSSON  2,647,226
DRY RECTIFIER VALVE PLATE
Filed Sept. 16, 1948
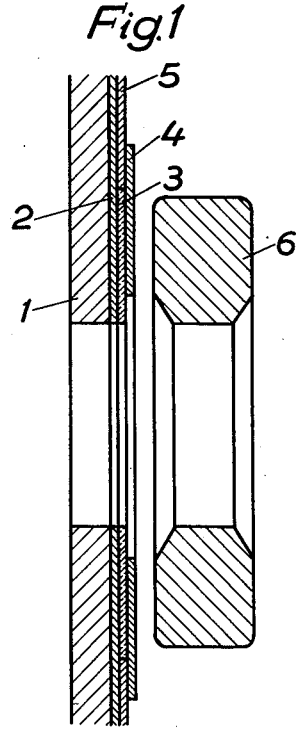
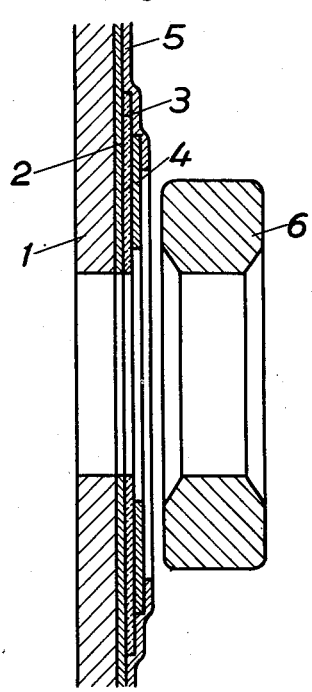
Inventor
Algot Arvidsson.
By [signature] Attorney.

Patented July 28, 1953

2,647,226

UNITED STATES PATENT OFFICE 2,647,226

DRY RECTIFIER VALVE PLATE

Algot Arvidsson, Ludvika, Sweden, assignor to Allmänna Svenska Elektriska Aktiebolaget, Vasteras, Sweden, a Swedish corporation Application September 16, 1948, Serial No. 49,500
In Sweden September 20, 1947

1 Claim. (Cl. 317—234)

In dry valve plates intended to form part of rectifiers, efforts have been made to take off the current only at a minor portion of the plate surface, either at the centre or at the periphery, and to increase in connection therewith the contact pressure at this portion as compared with that usual in connection with taking off the current at the major portion of the plate. As the semiconducting layer of the plate has been damaged by this higher contact pressure, an insulating layer has been placed between the semiconductor and the conductor (hereinafter referred to as the "current absorber") for taking off the current from the semi-conducting layer and conducting it to a terminal so as to make the portion of the semiconductor lying underneath the current absorber inactive. However, the experiments have shown, that not only the semiconducting layer, but also the counter electrode, which generally consists of a layer of metal with a low melting point applied by atomizing, have been damaged at the high contact pressures necessary, especially when the plate operates over extended periods near the highest permissible temperature limit of the plate, which causes the counter-electrode layer to be deformed and gradually to disappear, thus causing an interruption between the counter-electrode and the current absorber.

For preventing the just mentioned inconvenience there is placed beneath the current absorber, according to the present invention, a metal plate having a higher mechanical strength, especially at high temperature, than the counter electrode. The plate may consist of a metal foil manufactured in advance, for instance of tin or silver, or of a layer of an alloy or metal produced by atomisation, for instance of one of the aforesaid metals. In both these cases, the plate will be solidly secured to the counter-electrode, so that it will be able to transmit the current from the outer parts of the counter-electrode to the current absorber. The aforesaid metals are for several reasons not suited for use as a counter-electrode, but in this case they have not that function, since an insulating layer lies between them and the semiconductor, but the metal plate in question only serves as an intermediary conductor between the counter-electrode and the current absorber. For this purpose, the metal plate may at its periphery either cover the counter-electrode or be covered thereby.

In the accompanying drawing, Figs. 1 and 2 show in section two species of dry valve plates according to the present invention.

In both figures, 1 designates the base plate, 2 the semi-conducting layer, for instance of selenium, 3 an insulating layer covering the central portion of the semi-conducting layer, for instance consisting of paper or of an artificial composition, 4 the metal plate serving as an intermediary conductor, 5 the counter-electrode covering the major portion of the semiconductor, and 6 the current absorber, which for the sake of clearness is shown at some distance from the rest of the plate, but which in assembling is intended to bear against the metal plate 4 under a comparatively high pressure. As shown in the drawing, it is only the metal plate 4 with its underlying, electrically inactive parts which is subjected to pressure in assembling, while not only the active portion of the semiconductor 2, but also the counter-electrode 5 is relieved of such a pressure. In order to effect a wall-conducting connection between the counter-electrode and the metal plate 4, the latter may at its periphery either cover the former according to Fig. 1 or be covered thereby according to Fig. 2. The latter form might generally be preferred in using a counter-electrode manufactured by atomisation, as it affords a better possibility of checking the contact at the point of passage of the current.

I claim as my invention:

A dry rectifier valve plate, comprising a metallic base plate, a semi-conducting layer thereon, a metallic counter-electrode covering the major portion of said layer, an insulating layer in contact with the central portion of said semi-conducting layer, and a metallic current-transmitting layer of higher mechanical strength than said counter-electrode, at least at high temperature, said current-transmitting layer covering said insulating layer at its central portion and being covered by said counter-electrode at its peripheral portion.

ALGOT ARVIDSSON.

References Cited in the file of this patent

UNITED STATES PATENTS

| Number | Name | Date |
|---|---|---|
| 1,715,691 | Ackerly | June 4, 1929 |
| 2,314,104 | Richards et al. | Mar. 16, 1943 |
| 2,343,379 | Kotterman | Mar. 7, 1944 |
| 2,345,122 | Herrmann | Mar. 28, 1944 |
| 2,380,880 | Thompson et al. | July 31, 1945 |
| 2,434,960 | Richards | Jan. 27, 1948 |